US010262343B1

(12) United States Patent
Orekhov et al.

(10) Patent No.: US 10,262,343 B1
(45) Date of Patent: Apr. 16, 2019

(54) AD-BLOCKING SYSTEM USING RULE-BASED FILTERING OF INTERNET TRAFFIC

(71) Applicant: NOVNIFY LIMITED, Nicosia (CY)

(72) Inventors: Maksym V. Orekhov, Berdyansk (UA); Serhii Diakov, Boryspil (UA); Maksym Tatsenko, Kyev (UA); Iaroslav Rykhalskyi, Boryspil (UA); Maksym Slota, Kyiv (UA); Volodymyr Shelest, Kyiv (UA)

(73) Assignee: FigLeaf Limited, Nicosia (CY)

( * ) Notice: Subject to any disclaimer, the term of this patent is extended or adjusted under 35 U.S.C. 154(b) by 0 days.

(21) Appl. No.: 16/024,887

(22) Filed: Jul. 1, 2018

(51) Int. Cl.
  *H04L 29/06* (2006.01)
  *G06Q 30/02* (2012.01)
  *G06F 21/51* (2013.01)

(52) U.S. Cl.
  CPC ......... *G06Q 30/0277* (2013.01); *G06F 21/51* (2013.01)

(58) Field of Classification Search
  CPC .............................. G06Q 30/0277; G06F 21/51

USPC ...................................................... 726/26, 27
See application file for complete search history.

(56) References Cited

U.S. PATENT DOCUMENTS

| | | | | |
|---|---|---|---|---|
| 9,027,136 | B2* | 5/2015 | Be'ery | H04L 63/14 726/23 |
| 9,154,484 | B2* | 10/2015 | Wing | H04L 63/08 |
| 2010/0274799 | A1* | 10/2010 | Lee | H04L 41/12 707/769 |

* cited by examiner

*Primary Examiner* — Jahangir Kabir
(74) *Attorney, Agent, or Firm* — Inventa Capital PLC (57) ABSTRACT

Ad-blocking method, system, and computer program (the system) of the present invention uses rule-based filtering of Internet traffic through a set of interacting modules functioning at the system and user level to allow to exclude graphic, video, audio or text advertising content from the user-requested web content by filtering Internet traffic at the request stage and a response using the rules data base. The system provides the end user with the requested web content in the form of Internet pages in browsers or other representations in other applications (including instant messengers, platforms for streaming, etc.) excluding graphic, video, audio or text advertising content by filtering Internet traffic using the rules data base.

18 Claims, 1 Drawing Sheet

AD-BLOCKING SYSTEM USING RULE-BASED FILTERING OF INTERNET TRAFFIC

FIELD OF THE INVENTION

The present invention relates to a method for blocking network advertising, more particularly to a method for blocking unwanted network advertising while continuing the process of regular network activities.

BRIEF DESCRIPTION OF THE INVENTION

Today, publisher websites of all kinds include advertisements for companies, products, services and combinations thereof. These advertisements on a publisher website may include images, videos, text, animations, or other visual or audio messages.

The advertisements may be placed on a publisher web page by a variety of sources, such as, for example, purchase an advertisement block on the publisher web page directly from the publisher, through an advertising network and/or an advertising exchange, a demand side platform (DSP) or through some combination of these or other advertising channels, as known to those skilled in the art.

Unfortunately, it can be difficult for publishers to keep track of which advertisers are advertising on their webpage and, moreover, it can also be very difficult to track down which advertising channels are placing advertisements on their webpage. Since undesired advertisements creates many problems for the publishers, it can be extremely problematic for any given publisher that desires to prevent undesired advertisements from being displayed on the publisher's website to keep track of what advertisement is wanted and desired and what aren't.

The art is replete with various systems and methods United States Patent Application No. 20050055271 teaches a content owner partner (e.g., a Website/Web page publisher) can easily block entire broad or narrow categories of ads. Concepts may be associated with a property and ads related to those concepts may be blocked for the given property. Further, terms may be associated with a property and ads including any of the terms may be blocked for the given property.

Another prior art reference, namely, United States Patent Application No. 20060235960 teaches a method for blocking network advertising, which comprises the steps of installing a blocking software program having at least one blocking module in the storage medium of an electronic device, each blocking module has different blocking conditions going with a corresponding processing condition respectively, such that during the process of the electronic device reading a webpage editing content, the electronic device will execute the blocking software program and use the blocking module to process the webpage editing content. If the webpage editing content matches any of the blocking conditions, the corresponding processing condition will be used for processing accordingly and prevent the network advertising from appearing on the browser window or keep on processing the webpage editing content.

Still another prior art reference, such as Chinese patent application No. CN 103530560A teaches a method, device and client side for advertisement blocking. The method includes the following steps that web site information of a page to be viewed of a browser is obtained. The web site information is analyzed to judge whether the content of the page to be viewed is an advertisement or not. If the content of the page to be viewed is the advertisement, the content fed back to the loading content of the page to be viewed of the browser is intercepted. Based on the type of the page to be viewed, the loading content is replaced by preset content, and moreover the preset content after replacement is sent to the browser to be loaded.

To the extent as being effective, there is always a need for new and improved systems and methods for blocking and filtering of network advertising. It would therefore be desirable to be able to method for blocking network advertising, while continuing the process of regular network activities and offer improved systems for detecting and blocking undesirable internet-based advertisements.

The present invention aims to solve this problem by simple and convenient means.

SUMMARY OF THE INVENTION

Ad-blocking method, system, and computer program (the system) of the present invention uses rule-based filtering of Internet traffic through a set of interacting modules functioning at the system and user level to allow to exclude graphic, video, audio or text advertising content from the user-requested web content by filtering Internet traffic at the request stage and a response using the rules data base. The system provides the end user with the requested web content in the form of Internet pages in browsers or other representations in other applications (including instant messengers, platforms for streaming, etc.) excluding graphic, video, audio or text advertising content by filtering Internet traffic using the rules data base.

A computer-implemented method of the present invention is used for blocking network advertising, having a blocking software program installed in a storage device of a computing device of a user, the blocking software program having a blocking module software, the blocking module software defining a blocking condition and a processing condition corresponding to the blocking condition, such that after the user transmits, via the computing device, at least one outgoing Internet Protocol (IP) packet, the processing procedure of the computing device comprising the steps of parsing, by the blocking module software, the at least one outgoing IP packet, used as a request for a webpage from a remote server, to allocate one or more transmission control protocol (TCP) packets contained within the at least one outgoing IP packet, wherein the blocking module software is at least one of: a driver or a network kernel extension (Kext); identifying and selecting the one or more TCP packets containing one or more hypertext transfer protocol (HTTP) or hypertext transfer protocol secure (HTTPS) packets, the packets having remote ports 80 and 443, respectively, that were used to begin a TCP connection; assigning process identifiers (PID) to the selected one or more TCP packets and storing the PID corresponding to the selected one or more TCP packets in a list of TCP connections served, wherein the storing includes recording at least one remote IP address and at least one port associated with the selected one or more TCP packets.

The computer-implemented method includes further includes transferring the one or more selected TCP packets to TCP Server in Proxy by replacing the at least one remote IP address and the at least one port; receiving, by the TCP Server in Proxy, the selected one or more TCP packets and analyzing one or more uniform resource locator (URL) addresses against an exception list stored in a database, wherein the one or more URL addresses are part of the one or more HTTP or HTTPS packets contained within the selected one or more TCP packets, and wherein the processing condition of the selected TCP packets is determined by the exception list; wherein in response to the one or more URL addresses not being in the exception list, transferring the one or more HTTP or HTTPS packets to a URL Filter, the URL Filter being part of a Filter Engine.

The computer-implemented method further includes analyzing, by the URL Filter, the one or more URL addresses that are part of the one or more HTTP or HTTPS packets received by the Filter Engine to identify at least one blocking rule in the database for the one or more URL addresses; and in response to identifying the at least one blocking rule, blocking, by the URL Filter, the one or more HTTP or HTTPS packets from reaching the remote server, in accordance with one or more predetermined rules stored in the database.

The method further comprises the step wherein in response to identifying that the one or more URL addresses are included in the exception list, precluding the blocking software program from filtering the request for the webpage from the remote server; and in response to identifying that the one or more URL addresses are not included in the exception list, identifying the selected one or more TCP packets containing the one or more HTTPS packets that were used to begin HTTPS connection and replacing a certificate in order to establish a connection between the user and the remote server.

In response to blocking, by the URL Filter, the one or more HTTP or HTTPS packets from reaching the remote server, generating a special blocking response in place of a response from the remote server, and returning the special blocking response to the user; and in response to not blocking, by the URL Filter, the one or more HTTP or HTTPS packets from reaching the remote server, forwarding, by the TCP Client in Proxy and via the at least one blocking module software, the at least one outgoing IP packet to the remote server, wherein the TCP Client in Proxy modifies the remote ports 80 and 443 into remote ports 13080 or 13443, respectively.

The method further includes the step of intercepting, by the blocking module software, the at least one outgoing IP packet with the remote ports 13080 and 13443 and converting, by the blocking module software, the remote ports 13080 and 13443 back to the remote ports 80 and 443, respectively; and redirecting the at least one outgoing IP packet to the remote server. The method further includes the step of transmitting, to the remote server, the at least one outgoing IP packet that was used as the request for the webpage from the remote server; prompting the remote server to process the request for the webpage; and receiving, by the TCP Client in Proxy, the response from the remote server, wherein the blocking module software intercepts the response, converts local ports 80 and 443 into local ports 13080 or 13443, respectively, and redirects the local ports to the TCP Client in Proxy.

The method further includes the step of receiving, by the URL Filter, the response from the remote server; analyzing, by the URL Filter, the response to determine whether the at least one blocking rule in the database for the one or more URL addresses contained within the response exists, or whether the response is a Content-Type: text/html; and in response to identifying the at least one blocking rule, blocking the response from reaching the user, in accordance with one or more predetermined rules stored in the database.

The method further comprises the step wherein in response to identifying that the response is defined as the Content-Type: text/html or that the at least one blocking rule does not exist in the database for the one or more URL addresses, applying special content-based rules stored in the database to block a content, wherein the special content-based rules are CSS-rules or JavaScript-rules. The method further includes the step of performing a filtering of the content by applying the special content-based rules; returning the response from the remote server to the TCP Server in Proxy; and transmitting, via the blocking module software, a filtered response to the user, wherein the filtered response being transmitted contains packets having local port as a TCP Client Port in Proxy.

The method further includes the step of intercepting, by the blocking module software, the packets; restoring, by the blocking module software, the local port to an original port stored for the selected TCP packets in the list of TCP connections served; transmitting the filtered response to the user; and causing to display to the user the filtered response, wherein the filtered response contains non-advertising content, wherein the one or more predetermined rules are text strings including extended EasyList syntax, wherein the database is formed by using publicly available sources and artificial intelligence integrated in the blocking software program by utilizing user feedback, and wherein the database is continuously and automatically updated.

A computer-readable medium of the present invention is configured to store instructions that are executable by one or more processors to perform operations for blocking network advertising content using rule-based filtering of internet traffic comprising installing a blocking software program in a storage device of a computing device of a user, the blocking software program having a blocking module software, the blocking module software defining a blocking condition and a processing condition corresponding to the blocking condition; receiving, from the computing device of the user, at least one outgoing Internet Protocol (IP) packet requesting a webpage from a remote server; parsing, by the blocking module software, the at least one outgoing IP packet, used as a request for a webpage from a remote server, to allocate one or more transmission control protocol (TCP) packets contained within the at least one outgoing IP packet.

The blocking module software is at least one of: a driver or a network kernel extension (Kext); identifying and selecting the one or more TCP packets containing one or more hypertext transfer protocol (HTTP) or hypertext transfer protocol secure (HTTPS) packets, the packets having remote ports 80 and 443, respectively, that were used to begin a TCP connection; assigning process identifiers (PID) to the selected one or more TCP packets and storing the PID corresponding to the selected one or more TCP packets in a list of TCP connections served.

The storing includes recording at least one remote IP address and at least one port is associated with the selected one or more TCP packets; transferring the one or more selected TCP packets to TCP Server in Proxy by replacing the at least one remote IP address and the at least one port; receiving, by the TCP Server in Proxy, the selected one or more TCP packets and analyzing one or more uniform resource locator (URL) addresses against an exception list stored in a database, wherein the one or more URL addresses are part of the one or more HTTP or HTTPS packets contained within the selected one or more TCP packets, and wherein the processing condition of the selected TCP packets is determined by the exception list; in response to the one or more URL addresses not being in the exception list, transferring the one or more HTTP or HTTPS packets to a URL Filter, the URL Filter being part of a Filter Engine;

analyzing, by the URL Filter, the one or more URL addresses that are part of the one or more HTTP or HTTPS packets received by the Filter Engine to identify at least one blocking rule in the database for the one or more URL addresses; and in response to identifying the at least one blocking rule, blocking, by the URL Filter, the one or more HTTP or HTTPS packets from reaching the remote server, in accordance with one or more predetermined rules stored in the database.

The computer-readable medium further comprises in response to identifying that the one or more URL addresses are included in the exception list, precluding the blocking software program from filtering the request for the webpage from the remote server; and in response to identifying that the one or more URL addresses are not included in the exception list, identifying the selected one or more TCP packets containing the one or more HTTPS packets that were used to begin HTTPS connection and replacing a certificate in order to establish a connection between the user and the remote server.

The computer-readable medium further comprises, in response to blocking, by the URL Filter, the one or more HTTP or HTTPS packets from reaching the remote server, generating a special blocking response in place of a response from the remote server, and returning the special blocking response to the user; and in response to not blocking, by the URL Filter, the one or more HTTP or HTTPS packets from reaching the remote server, forwarding, by the TCP Client in Proxy and via the at least one blocking module software, the at least one outgoing IP packet to the remote server, wherein the TCP Client in Proxy modifies the remote ports 80 and 443 into remote ports 13080 or 13443, respectively.

The computer-readable medium further comprises intercepting, by the blocking module software, the at least one outgoing IP packet with the remote ports 13080 and 13443; converting, by the blocking module software, the remote ports 13080 and 13443 back to the remote ports 80 and 443, respectively; and redirecting the at least one outgoing IP packet to the remote server.

The computer-readable medium further comprises transmitting, to the remote server, the at least one outgoing IP packet that was used as the request for the webpage from the remote server; prompting the remote server to process the request for the webpage; and receiving, by the TCP Client in Proxy, the response from the remote server, wherein the blocking module software intercepts the response, converts local ports 80 and 443 into local ports 13080 or 13443, respectively, and redirects the local ports to the TCP Client in Proxy.

The computer-readable medium further includes receiving, by the URL Filter, the response from the remote server; analyzing, by the URL Filter, the response to determine whether the at least one blocking rule in the database for the one or more URL addresses contained within the response exists, or whether the response is a Content-Type: text/html; and in response to identifying the at least one blocking rule, blocking the response from reaching the user, in accordance with one or more predetermined rules stored in the database.

The computer-readable medium includes in response to identifying that the response is defined as the Content-Type: text/html or that the at least one blocking rule does not exist in the database for the one or more URL addresses, applying special content-based rules stored in the database to block a content, wherein the special content-based rules are CSS-rules or JavaScript-rules. The computer-readable medium includes the step of performing a filtering of the content by applying the special content-based rules; returning the response from the remote server to the TCP Server in Proxy; and transmitting, via the blocking module software, a filtered response to the user, wherein the filtered response being transmitted contains packets having local port as a TCP Client Port in Proxy.

The computer-readable medium further includes the step of intercepting, by the blocking module software, the packets; restoring, by the blocking module software, the local port to an original port stored for the selected TCP packets in the list of TCP connections served; transmitting the filtered response to the user; and causing to display to the user the filtered response, wherein the filtered response contains non-advertising content. The computer-readable medium wherein the one or more predetermined rules are text strings including extended EasyList syntax, wherein the database is formed by using publicly available sources and artificial intelligence integrated in the blocking software program by utilizing user feedback, and wherein the database is continuously and automatically updated.

An advantage of the present invention is to provide the ad-blocking system, which allows filtering of network traffic, excluding advertising content, in all installed applications (including browsers, messengers, platforms for streaming, etc.) due to the use of modules functioning at the system level: Kernel network extension (Mac OS X), WFP\TDI Driver (MS Windows).

Another advantage of the present invention is to provide the ad-blocking system, which is adaptable for the Mac OS X platform version, wherein traffic analysis is performed at the IP packet level using the network kernel extension to allow monitoring and properly processing TCP packets contained in IP packets.

Still another advantage of the present invention is to provide the ad-blocking system, wherein user feedback form is integrated into the system and allows instant process of the application of the user, to form the necessary rules and to supplement the rules data base with them.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
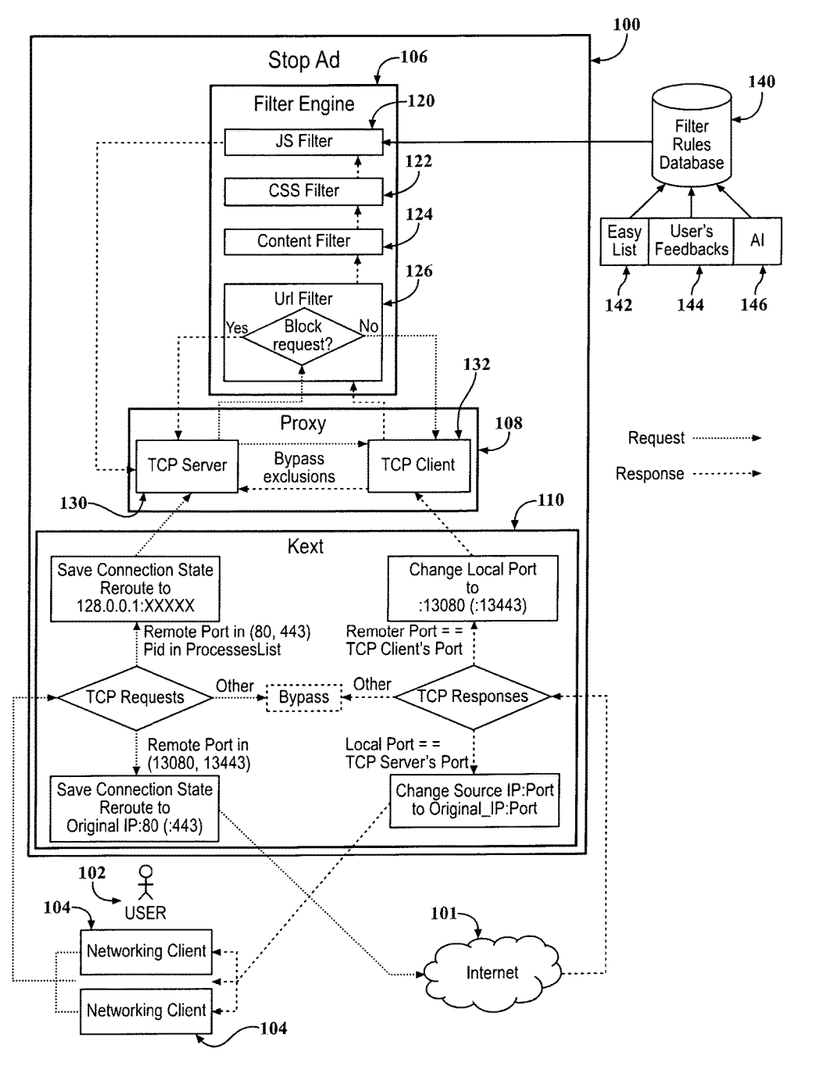
FIG. 1 illustrates a schematic view of an ad-blocking system of the present invention.

Referring to the FIGURES, wherein like numerals indicate like or corresponding parts, an ad-blocking method, system, and computer program using rule-based filtering of Internet traffic (the system) of the present invention is disclosed herewith and is generally shown at 10 in FIG. 1.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring back to FIG. 1, the system 100 is a web-based application used via Internet 101 by users 102 and networking clients 104 and includes a filter engine module, generally indicated at 106, a proxy module, generally indicated at 108, and a Kext module, generally indicated at 110. The filter module 106 includes a JS Filter 120, a CSS Filter 122, a Content Filter 124, and a Url Filter 126. The proxy section 108 includes a TCP Server 130 and TCP Client 132. The system 100 also includes a Filter Rules Database 140 that received Easy list information 142, User's Feedbacks information 144, and all and any other information 146.

The system 100 includes at least one non-transitory computer-readable storage medium with computer-readable instructions stored therein, a database, and a processor for executing the computer-readable instructions to install a blocking software program in a storage device of a computing device of the user 102, the blocking software program having the blocking module software 110, the blocking module software 110 defining a blocking condition and a processing condition corresponding to the blocking condition.

The processor receives, from the computing device of the user 102, at least one outgoing Internet Protocol (IP) packet requesting a webpage from a remote server and parses, by the blocking module software 110, the at least one outgoing IP packet to allocate one or more transmission control protocol (TCP) packets contained within the at least one outgoing IP packet, wherein the blocking module software 110 is at least one of: a driver or a network kernel extension (Kext). The system 100 is configured to identify and select the one or more TCP packets containing one or more hypertext transfer protocol (HTTP) or hypertext transfer protocol secure (HTTPS) packets, the packets having remote ports 80 and 443, respectively, that were used to begin a TCP connection.

The system 100 is configured to assign process identifiers (PID) to selected TCP packets and store the PID corresponding to the selected TCP packets in a list of TCP connections served, wherein the storing includes recording remote IP addresses and ports. The system 100 then transfers the selected TCP packets to TCP Server in Proxy 130 by replacing the remote IP addresses and the ports and receives, from the remote server, a first response to a request for the webpage as one or more TCP packets containing one or more HTTP or HTTPS packets. The system 100 is configured to identify the selected TCP packets within the one or more TCP packets received and redirect the one or more HTTP or HTTPS packets contained within the selected TCP packets to a URL Filter 126 to analyze an IP address associated with the response, wherein the URL Filter 126 is a first filter of a Filter Engine 106.

The first filter used is for the outgoing packets and the filtering is performed by the URL Filter of the Filter Engine 106, which analyses HTTP/HTTPS requests to the server. The URL Filter blocks advertising resources for the queries with the URLs for which there are blocking rules found in the rules database. The Filter further creates a special blocking response. More specifically, the outgoing request packets contain an URL address of the requested resource that can be both a webpage (an HTML document) and (in most cases) elements necessary to display a webpage correctly, such as images (JPG, PNG, etc.), media files (MOV, MP4, streams, formats), or scripts and styles (JS, CSS). These elements, along with a webpage, are downloaded by a browser automatically.

Whenever each listed element (a webpage, images, media, scripts, etc.) is downloaded, a separate outgoing request with its specific URL is generated. The analysis of URLs suggests that a request is generated to receive an advertising content (webpages, images, media, scripts, etc.). In other words, a user (or a browser operating automatically) does not send any advertising content in such request, but makes a request to receive it. For Example: A user enters the URL https://www.yahoo.com/ in the browser's address bar. The browser starts downloading the webpage. An image having the URL https://s.yimg.com/cv/api/default/20180321/WORLDCUP_MOBILE_UK_ENG.png is one of the resources required to display this webpage. The browser automatically generates a request for this URL to download the image and paste it into the webpage. For example, https://s.yimg.com/cv/api/default/20180321/WORLDCUP_MOBILE_UK_ENG.png leads to a banner ad. A user does not make this request himself/herself. The request is generated automatically by the browser when the webpage https://www.yahoo.com/ is downloaded. The URL filter checks URL addresses of all outgoing requests (a webpage or any content downloaded automatically, such as images, media, scripts, etc.). The URL filter uses the database, which contains rules to identify URLs which lead to an ad content (e.g. an entire ad webpage or a resource downloaded automatically, such as images, media, scripts, etc.). The check performed by the URL filter is to find a rule in the database which classifies the URL as an ad (without analyzing the content—the Ad URL database is checked for the presence of a specific URL).

If the URL of the requested resource is defined as an ad, the request to the remote server is then blocked, and the browser receives a specially generated blocking response. In other words, The URL Filter, which analyses URL addresses from HTTP\HTTPS requests, is applied first in the Filter Engine 106. If any blocking rules are found in the database for a specific URL, this suggests that this URL leads to an advertising content. Such request to the remote server will be blocked, and a special blocking response will be generated instead of a response from the remote server.

The system 100 is configured to block, by the URL Filter 126 in accordance with one or more predetermined rules stored in the database, content based on an IP address without analyzing the content and in response to the URL Filter 126 not being able to block the content, redirect the HTTP or HTTPS packets to TCP Client in Proxy 132 for filtering the content. The system 100 is further configured to: in response to identifying that the IP address is included in an exception list, preclude the blocking software program from filtering the content; and in response to identifying that the IP address is not included in the exception list, identify the selected TCP packets containing HTTP or HTTPS packets that were used to begin HTTP or HTTPS connection and replace a certificate in order to establish a connection between the user 102 and the remote server.

The system 100 is further configured to: forward, by the TCP Client in Proxy 132 and via the at least one blocking module software 110, the at least one outgoing IP packet to the remote server, wherein the TCP Client in Proxy 132 modifies the remote ports 80 and 443 into remote ports 13080 or 13443, respectively. The server is further configured to: intercept, by the blocking module software 110, the at least one outgoing IP packet with the remote ports 13080 and 13443; convert, by the blocking module software 110, the remote ports 13080 and 13443 back to the remote ports 80 and 443, respectively; and redirect the at least one outgoing IP packet to the remote server.

The server is further configured to: transmit, to the remote server, the at least one outgoing IP packet that was used as the request for the webpage from the remote server and prompt the remote server to process the request for the webpage, and to receive, from the remote server and via the at least one blocking module software 110, a second response to the TCP Client in Proxy 132, wherein the blocking module software 110 intercepts the response, converts local ports 80 and 443 into local ports 13080 or 13443, respectively, and redirects the local ports to the TCP Client in Proxy. The server is further configured to: analyze, by the Filter Engine 106, the second response, wherein analysis includes content-type text/html analysis, wherein the URL Filter 126 is used again, in accordance with the predetermined rules stored in the database, to block the content based on the IP address.

The server is further configured to: in response to identifying that the second response is defined as a content-type text/html response and that no blocking rules were found in the URL Filter 126, apply special content-based rules stored in the database to block the content, wherein the special content-based rules are CSS-rules or JavaScript-rules. The server is further configured to: perform a filtering of the content by applying the special content-based rules; return the second response to the TCP Server in Proxy; and transmit, via the blocking module software 110, a filtered response to the user 102, wherein the filtered response being transmitted contains packets having local port as a TCP Client Port in Proxy.

The server is further configured to: intercept, by the blocking module software 110, the packets; restore, by the blocking module software 110, the local port to an original port stored for the selected TCP packets in the list of TCP connections served; transmit the filtered response to the user 102; and to cause to display to the user 102 the filtered response, wherein the filtered response contains non-advertising content. The one or more predetermined rules are text strings including extended EasyList syntax, wherein the database is formed by using publicly available sources and artificial intelligence integrated in the blocking software program by utilizing user feedback, and wherein the database is continuously and automatically updated.

A computer-implemented method of the present invention is used for blocking network advertising, having a blocking software program installed in a storage device of a computing device of a user 102. The blocking software program has the blocking module software 110. The blocking module software 110 defines a blocking condition and a processing condition corresponding to the blocking condition, such that after the user transmits, via the computing device 102, at least one outgoing Internet Protocol (IP) packet, the processing procedure of the computing device comprising the steps of: parsing, by the blocking module software 110, the at least one outgoing IP packet, used as a request for a webpage from a remote server, to allocate one or more transmission control protocol (TCP) packets contained within the at least one outgoing IP packet, wherein the blocking module software 110 is at least one of: a driver or a network kernel extension (Kext).

The computer-implemented method includes the step of identifying and selecting the one or more TCP packets containing one or more hypertext transfer protocol (HTTP) or hypertext transfer protocol secure (HTTPS) packets, the packets having remote ports 80 and 443, respectively, that were used to begin a TCP connection followed by assigning process identifiers (PID) to selected TCP packets and storing the PID corresponding to the selected TCP packets in a list of TCP connections served, wherein the storing includes recording remote IP addresses and ports. transferring the selected TCP packets to TCP Server in Proxy 130 by replacing the remote IP addresses and the ports.

The computer-implemented method includes the step of receiving, from the remote server, a first response to the request for the webpage as one or more TCP packets containing one or more HTTP or HTTPS packets followed by identifying the selected TCP packets within the one or more TCP packets received and redirecting the one or more HTTP or HTTPS packets contained within the selected TCP packets to a URL Filter 126 to analyze an IP address associated with the response, wherein the URL Filter 126 is a first filter of a Filter Engine 106.

The computer-implemented method includes the step of blocking, by the URL Filter 126 in accordance with one or more predetermined rules stored in a database, content based on an IP address without analyzing the content wherein in response to the URL Filter 126 not being able to block the content, redirecting the HTTP or HTTPS packets to TCP Client in Proxy 132 for filtering the content.

The computer-implemented method includes the step, wherein, in response to identifying that the IP address is included in an exception list, precluding the blocking software program from filtering the content; and in response to identifying that the IP address is not included in the exception list, identifying the selected TCP packets containing HTTP or HTTPS packets that were used to begin HTTP or HTTPS connection and replacing a certificate in order to establish a connection between the user 102 and the remote server.

The method further includes the step of forwarding, by the TCP Client in Proxy 132 and via the at least one blocking module software 110, the at least one outgoing IP packet to the remote server, wherein the TCP Client in Proxy 132 modifies the remote ports 80 and 443 into remote ports 13080 or 13443, respectively. The method further includes the step of intercepting, by the blocking module software 110, the at least one outgoing IP packet with the remote ports 13080 and 13443; converting, by the blocking module software 110, the remote ports 13080 and 13443 back to the remote ports 80 and 443, respectively; and redirecting the at least one outgoing IP packet to the remote server.

The method further includes the step of transmitting, to the remote server, the at least one outgoing IP packet that was used as the request for the webpage from the remote server; prompting the remote server to process the request for the webpage; and receiving, from the remote server and via the at least one blocking module software 110, a second response to the TCP Client in Proxy 132, wherein the blocking module software 110 intercepts the response, converts local ports 80 and 443 into local ports 13080 or 13443, respectively, and redirects the local ports to the TCP Client in Proxy.

The method further includes the step of analyzing by the Filter Engine 106 the second response, wherein analysis includes content-type text/html analysis, wherein the URL Filter 126 is used again, in accordance with the predetermined rules stored in the database, to block the content based on the IP address. In response to identifying that the second response is defined as a content-type text/html response and that no blocking rules were found in the URL Filter 126, applying special content-based rules stored in the database to block the content, wherein the special content-based rules are CSS-rules or JavaScript-rules.

The method further includes the step of performing a filtering of the content by applying the special content-based rules; returning the second response to the TCP Server in Proxy; and transmitting, via the blocking module software 110, a filtered response to the user 102, wherein the filtered response being transmitted contains packets having local port as a TCP Client Port in Proxy.

The method further includes the step of intercepting, by the blocking module software 110, the packets; restoring, by the blocking module software 110, the local port to an original port stored for the selected TCP packets in the list of TCP connections served; transmitting the filtered response to the user 102; and causing to display to the user 102 the filtered response, wherein the filtered response contains non-advertising content. One or more predetermined rules are text strings including extended EasyList syntax, wherein the database is formed by using publicly available sources and artificial intelligence integrated in the blocking software program by utilizing user feedback, and wherein the database is continuously and automatically updated.

Alluding to the above, below please find additional information that is disclosed herewith to supplement, add, and further define what was disclosed above without limiting the scope of the present invention. The software of the is delivered to the end user as a DMG (Mac) or MSI (Win) package and installed on the system 100. During the installation of the program, a driver (Win) or network kernel extension (Mac) is also installed in the user's system. After installing and running the application, all network traffic of the user from all applications passes through the driver (Win)/network kernel extension (Mac). For example, a user opens a website through a browser, all requests for downloading pages and other resources of the site go through driver (Win)/network kernel extension (Mac), TCP requests are redirected to the Proxy and, if necessary, passed through the filter engine. If the request is blocked, the blocking response is returned to the user application; otherwise it is forwarded to the original recipient. This process is described for Mac in more detail below.

Alluding to the above, the process of network traffic filtering for Mac will now be described. Referring to "User client", a user application that displays network activity sends outgoing IP packets. The IP packet includes TCP packets, which include HTTP(s) packets. The IP packet also includes the IP address of a packet sender (user) and the IP address of a packet receiver (server), for example, requesting a web page from the browser. Moving forward, the next stage is called "Kext". Kext analyzes all outgoing IP packets (user requests), among which the TCP packets are defined according to the key elements (SYN/ACK/URG/RST/FIN/PSH) by the system elements (libraries) built into MacOS. Among the TCP packets, the system elements (libraries) embedded in MacOS select the TCP packets containing HTTP/HTTPS packets (TCP packets with Remote ports 80 and 443). The system elements (libraries) embedded into MacOS define the Process Identifier (PID), wherein each application (Chrome, Safari, Torrent, etc)., has one or more processes that exhibit network activity and at the same time these processes are identified in accordance with the PID that is allocated to the process each time the system is started) of TCP packets with ports 80 and 443.

After that, the TCP packets with ports 80 and 443 with PID from the list served by our application are selected. The analysis of selected (and identified as serviced) TCP packets is performed. There are TCP packets starting (initiating) connections, TCP packets transmitting data, and TCP packets that terminate the connection. If there are received packets that identify the beginning of TCP connection, between the user and the server, then the identifiers for such TCP connections, are stored in the list of TCP connections served for further processing. These identifiers are assigned to TCP connections for user's convenience. For the packets belonging to the served connections, remote IP addresses and ports are kept, after which they are redirected to TCP Server in Proxy by replacing the remote IP address with "localhost", and the port with port #13577.

The next stage is called "Proxy". TCP Server in Proxy analyses the redirected, previously selected TCP packets. If the URL address (part of the HTTP packet that is part of the TCP packet) is in the exception list, the traffic filtering is not applied. The list of exceptions is a list of sites where the program does not work (banks, financial institutions, etc.). Such a list is formed partly by administrator, and partly by the user at his own discretion.

If the URL address is not in the list of exceptions, the system will proceed as follows: for the packets that define the beginning of HTTPS sessions Like TCP packets, HTTPS packets can also be initiating, intermediate and terminating HTTPS sessions. The certificate is replaced when an attempt is made to establish a connection between the user client and the remote server, in fact, the connection is established between the user client (for example, the browser) and TCP Server in Proxy. The certificate is needed to decrypt the data of HTTPS packet. Without the certificate, HTTPS data cannot be read. This clause is applicable only in case of HTTPS sessions.

All HTTP/HTTPS data packets, the URLs of which are not in the exception list, are redirected to the Filter Engine. The first filter used in the Filter Engine is Url Filter, which analyses HTTP/HTTPS requests to the server. Moreover, the system allows to block advertising resources by creating a special blocking response for the queries with the URLs for which there blocking rules found in the rules data base.

Alluding to the above, the request does not go to the remote server and instead of the URL request to the advertising banner (image), the user receives an empty HTTP response. Thus, the URL is blocked. For example, each page of newyorktimes.com contains a lot of links to advertising banners. In the page structure these links to banners are represented as URL requests (they are in the script; there can be direct links, etc.). In any case, browser will send a request for this URL when displaying the page and we will intercept such browser requests to advertising banners on newyorktimes.com in Kext. If the HTTP request was blocked, then the blocking response is returned to the TCP Server in the Proxy, from there via Kext with the restoration of the stored original IP and Port.

It is necessary for the user's browser, from which the request was sent to newyorktimes.com, to recognize the response as if the response came from a remote server. Because the address of type local host: xxxxxx cannot by processed by the browser, it is returned back to the user client. This is all the primary stage of filtering—blocking the request. That is, a white background will be displayed instead of a banner on the newyorktimes.com page, as the URL request for the original banner on the newyorktimes.com page was already blocked by us at this stage. If the request has not been blocked in the Url Filter, then it is redirected to the TCP Client in the Proxy for further filtering.

If URL-filtering of the request did not occur, now TCP-Client acts as a browser and communicates with remote servers, forwards original outgoing packets (request to newyorktimes.com) via Kext to the original IP of the remote server (newyorktimes.com) while modifying Remote ports 80 and 443 to 13080 or 13443 respectively, so that Kext can recognize these packets as already processed and redirect them to remote servers with original IP addresses (i.e. to newyorktimes.com). i.e. that have already had URL request pre-filtered. In case the original ports remained, the request would be sent to URL filtration again and again.

Kext intercepts the outgoing packets with Remote ports 13080 or 13443 and changing the ports back to 80 or 443 respectively redirects them to the server with the original IP addresses and ports. For the request to reach the remote server correctly. If the ports are not changed back and are left 13080 and 13443, then the remote server will not be able to process them. The remote server (newyorktimes.com) receives the original user request, processes it and returns a response (to the TCP client via Kext). Kext intercepts the incoming packets, Content from a remote server. Whose Remote port is the TCP Client port in Proxy, changes Local ports 80 and 443 to 13080 or 13443 respectively, so that TCP Client could correctly accept them, and redirects them to TCP Client in Proxy. TCP packet with a user request to a remote server has a local port (user port) and a remote port (remote server port).

If the remote server sends a response to a user request in a TCP packet with a server response to a user request, such a TCP packet from the server has a local server port and a remote user port. Since the TCP client in Proxy carries out a role of the user at the filtration stage, following the primary filtration stage on URL-request, the TCP-client accordingly has its port too.

Filter Engine performs an additional analysis of the response from the remote server. The response contains different types of content in the form of banners, text, images, etc. (including Content-Type: text/html), Url Filter is re-used with the help of which the advertising content is blocked, if any blocking rules are found for its URL in the rules data base, related to this type of content. If the blocking rules for this content were not found, then we go for the next stage. If the response content type is text/html (and no blocking rules were found for it at the previous stage), the response content is analyzed with an attempt to apply the content of the rule to block such advertising content.

After that, special rules are inserted into the response body: css-rules and javascript-rules from the rules data base. CSS and Javascript are not analysed, a set of universal rules is applied. They are used for: Changing the layout of web pages after filtering by URL in order to hide the advertising resources that were still loaded due to the lack of a corresponding URL-blocking rule in the rules data base.; Improving the appearance of web pages by eliminating empty units that were intended for resources that were blocked. A rules data base is used to take decision in relation to the advertising content and the need to block it. The rules are text strings using the extended EasyList syntax.

The rules data base is maintained up-to-date and its updates are automatically delivered to end users. Proxy: After filtering, the response filtered and modified with regard to the inserted CSS and Javascript rules, which were initially received from a remote server and filtered, is returned to the TCP Server in Proxy. From TCP Server in Proxy, the response is sent via Kext to the user client. For example, Chrome browser.

Kext intercepts the incoming packets whose Local port is the TCP Client port in Proxy, restores Original_IP:Local_Port to the original from the stored TCP connection data and forwards it to the user client. The user application receives a filtered response. Filtered, non-advertising content. (Each resource that is downloaded for a web page (image, video, text, wherein each element of the web page is filtered separately).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method for blocking network advertising,
   having a blocking software program installed in a storage device of a computing device of a user, the blocking software program having a blocking module software, the blocking module software defining a blocking condition and a processing condition corresponding to the blocking condition, such that after the user transmits, using the computing device, at least one outgoing Internet Protocol (IP) packet, the processing procedure of the computing device comprising the steps of:
   parsing, by the blocking module software, the at least one outgoing IP packet, used as a request for a webpage from a remote server, to allocate one or more transmission control protocol (TCP) packets contained within the at least one outgoing IP packet, wherein the blocking module software is at least one of: a driver or a network kernel extension (Kext);
   identifying and selecting the one or more TCP packets containing one or more hypertext transfer protocol (HTTP) or hypertext transfer protocol secure (HTTPS) packets, the packets having remote ports 80 and 443, respectively, that were used to begin a TCP connection;
   assigning process identifiers (PID) to the selected one or more TCP packets and storing the PID corresponding to the selected one or more TCP packets in a list of TCP connections served, wherein the storing includes recording at least one remote IP address and at least one port associated with the selected one or more TCP packets;

transferring the one or more selected TCP packets to TCP Server in Proxy by replacing the at least one remote IP address and the at least one port;

receiving, by the TCP Server in Proxy, the selected one or more TCP packets and analyzing one or more uniform resource locator (URL) addresses against an exception list stored in a database, wherein the one or more URL addresses are part of the one or more HTTP or HTTPS packets contained within the selected one or more TCP packets, and wherein the processing condition of the selected TCP packets is determined by the exception list;

in response to identifying that the one or more URL addresses are included in the exception list, precluding the blocking software program from filtering the request for the webpage from the remote server; and in response to identifying that the one or more URL addresses are not included in the exception list:

identifying the selected one or more TCP packets containing the one or more HTTPS packets that were used to begin HTTPS connection and replacing a certificate in order to establish a connection between the user and the remote server;

transferring the one or more HTTP or HTTPS packets to a URL Filter, the URL Filter being part of a Filter Engine;

analyzing, by the URL Filter, the one or more URL addresses that are part of the one or more HTTP or HTTPS packets received by the Filter Engine to identify at least one blocking rule in the database for the one or more URL addresses; and in response to identifying the at least one blocking rule, blocking, by the URL Filter, the one or more HTTP or HTTPS packets from reaching the remote server, in accordance with one or more predetermined rules stored in the database.

2. The method according to claim 1, further comprising:
in response to blocking, by the URL Filter, the one or more HTTP or HTTPS packets from reaching the remote server, generating a special blocking response in place of a response from the remote server, and returning the special blocking response to the user; and in response to not blocking, by the URL Filter, the one or more HTTP or HTTPS packets from reaching the remote server, forwarding, by the TCP Client in Proxy and via the at least one blocking module software, the at least one outgoing IP packet to the remote server, wherein the TCP Client in Proxy modifies the remote ports 80 and 443 into remote ports 13080 or 13443, respectively.

3. The method according to claim 2, further comprising:
intercepting, by the blocking module software, the at least one outgoing IP packet with the remote ports 13080 and 13443;
converting, by the blocking module software, the remote ports 13080 and 13443 back to the remote ports 80 and 443, respectively; and
redirecting the at least one outgoing IP packet to the remote server.

4. The method according to claim 3, further comprising:
transmitting, to the remote server, the at least one outgoing IP packet that was used as the request for the webpage from the remote server;
prompting the remote server to process the request for the webpage; and
receiving, by the TCP Client in Proxy, the response from the remote server, wherein the blocking module software intercepts the response, converts local ports 80 and 443 into local ports 13080 or 13443, respectively, and redirects the local ports to the TCP Client in Proxy.

5. The method according to claim 4, further comprising:
receiving, by the URL Filter, the response from the remote server;
analyzing, by the URL Filter, the response to determine whether the at least one blocking rule in the database for the one or more URL addresses contained within the response exists, or whether the response is a Content-Type: text/html; and
in response to identifying the at least one blocking rule, blocking the response from reaching the user, in accordance with one or more predetermined rules stored in the database.

6. The method according to claim 5, further comprising:
in response to identifying that the response is defined as the Content-Type: text/html or that the at least one blocking rule does not exist in the database for the one or more URL addresses, applying special content-based rules stored in the database to block a content, wherein the special content-based rules are CSS-rules or JavaScript-rules.

7. The method according to claim 6, further comprising:
performing a filtering of the content by applying the special content-based rules;
returning the response from the remote server to the TCP Server in Proxy; and
transmitting, via the blocking module software, a filtered response to the user, wherein the filtered response being transmitted contains packets having local port as a TCP Client Port in Proxy.

8. The method according to claim 7, further comprising:
intercepting, by the blocking module software, the packets;
restoring, by the blocking module software, the local port to an original port stored for the selected TCP packets in the list of TCP connections served;
transmitting the filtered response to the user; and
causing to display to the user the filtered response, wherein the filtered response contains non-advertising content.

9. The method according to claim 1, wherein the one or more predetermined rules are text strings including extended EasyList syntax, wherein the database is formed by using publicly available sources and artificial intelligence integrated in the blocking software program by utilizing user feedback, and wherein the database is continuously and automatically updated.

10. A computer-readable medium configured to store instructions that are executable by one or more processors to perform operations for blocking network advertising content using rule-based filtering of Internet traffic comprising:
installing a blocking software program in a storage device of a computing device of a user, the blocking software program having a blocking module software, the blocking module software defining a blocking condition and a processing condition corresponding to the blocking condition;

receiving, from the computing device of the user, at least one outgoing Internet Protocol (IP) packet requesting a webpage from a remote server;

parsing, by the blocking module software, the at least one outgoing IP packet, used as a request for a webpage from a remote server, to allocate one or more transmission control protocol (TCP) packets contained within the at least one outgoing IP packet, wherein the blocking module software is at least one of: a driver or a network kernel extension (Kext);

identifying and selecting the one or more TCP packets containing one or more hypertext transfer protocol (HTTP) or hypertext transfer protocol secure (HTTPS) packets, the packets having remote ports 80 and 443, respectively, that were used to begin a TCP connection;

assigning process identifiers (PID) to the selected one or more TCP packets and storing the PID corresponding to the selected one or more TCP packets in a list of TCP connections served, wherein the storing includes recording at least one remote IP address and at least one port associated with the selected one or more TCP packets;

transferring the one or more selected TCP packets to TCP Server in Proxy by replacing the at least one remote IP address and the at least one port;

receiving, by the TCP Server in Proxy, the selected one or more TCP packets and analyzing one or more uniform resource locator (URL) addresses against an exception list stored in a database, wherein the one or more URL addresses are part of the one or more HTTP or HTTPS packets contained within the selected one or more TCP packets, and wherein the processing condition of the selected TCP packets is determined by the exception list;

in response to identifying that the one or more URL addresses are included in the exception list, precluding the blocking software program from filtering the request for the webpage from the remote server; and in response to identifying that the one or more URL addresses are not included in the exception list:

identifying the selected one or more TCP packets containing the one or more HTTPS packets that were used to begin HTTPS connection and replacing a certificate in order to establish a connection between the user and the remote server;

transferring the one or more HTTP or HTTPS packets to a URL Filter, the URL Filter being part of a Filter Engine;

analyzing, by the URL Filter, the one or more URL addresses that are part of the one or more HTTP or HTTPS packets received by the Filter Engine to identify at least one blocking rule in the database for the one or more URL addresses; and in response to identifying the at least one blocking rule, blocking, by the URL Filter, the one or more HTTP or HTTPS packets from reaching the remote server, in accordance with one or more predetermined rules stored in the database;

wherein the computer-readable medium is non-transitory.

11. The computer-readable medium according to claim 10, further comprising:

in response to blocking, by the URL Filter, the one or more HTTP or HTTPS packets from reaching the remote server, generating a special blocking response in place of a response from the remote server, and returning the special blocking response to the user; and in response to not blocking, by the URL Filter, the one or more HTTP or HTTPS packets from reaching the remote server, forwarding, by the TCP Client in Proxy and via the at least one blocking module software, the at least one outgoing IP packet to the remote server, wherein the TCP Client in Proxy modifies the remote ports 80 and 443 into remote ports 13080 or 13443, respectively.

12. The computer-readable medium according to claim 11, further comprising:

intercepting, by the blocking module software, the at least one outgoing IP packet with the remote ports 13080 and 13443;

converting, by the blocking module software, the remote ports 13080 and 13443 back to the remote ports 80 and 443, respectively; and redirecting the at least one outgoing IP packet to the remote server.

13. The computer-readable medium according to claim 12, further comprising:

transmitting, to the remote server, the at least one outgoing IP packet that was used as the request for the webpage from the remote server;

prompting the remote server to process the request for the webpage; and receiving, by the TCP Client in Proxy, the response from the remote server, wherein the blocking module software intercepts the response, converts local ports 80 and 443 into local ports 13080 or 13443, respectively, and redirects the local ports to the TCP Client in Proxy.

14. The computer-readable medium according to claim 13, further comprising:

receiving, by the URL Filter, the response from the remote server;

analyzing, by the URL Filter, the response to determine whether the at least one blocking rule in the database for the one or more URL addresses contained within the response exists, or whether the response is a Content-Type: text/html; and in response to identifying the at least one blocking rule, blocking the response from reaching the user, in accordance with one or more predetermined rules stored in the database.

15. The computer-readable medium according to claim 14, further comprising:

in response to identifying that the response is defined as the Content-Type: text/html or that the at least one blocking rule does not exist in the database for the one or more URL addresses, applying special content-based rules stored in the database to block a content, wherein the special content-based rules are CSS-rules or JavaScript-rules.

16. The computer-readable medium according to claim 15, further comprising:

performing a filtering of the content by applying the special content-based rules;

returning the response from the remote server to the TCP Server in Proxy; and transmitting, via the blocking module software, a filtered response to the user, wherein the filtered response being transmitted contains packets having local port as a TCP Client Port in Proxy.

17. The computer-readable medium according to claim 16, further comprising:

intercepting, by the blocking module software, the packets;

restoring, by the blocking module software, the local port to an original port stored for the selected TCP packets in the list of TCP connections served;

transmitting the filtered response to the user; and causing to display to the user the filtered response, wherein the filtered response contains non-advertising content.

18. The computer-readable medium according to claim 10, wherein the one or more predetermined rules are text strings including extended EasyList syntax, wherein the database is formed by using publicly available sources and artificial intelligence integrated in the blocking software program by utilizing user feedback, and wherein the database is continuously and automatically updated.

\* \* \* \* \*